June 7, 1927.
G. WASHINGTON
1,631,302
FILM WINDING SPOOL FOR CAMERAS
Original Filed Feb. 1, 1926
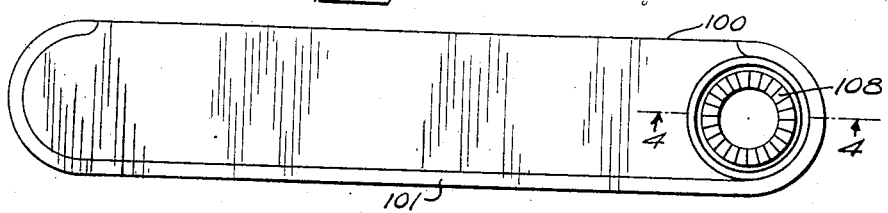
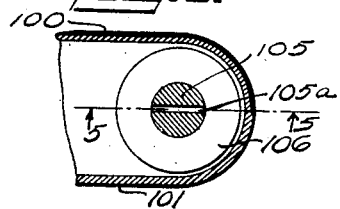
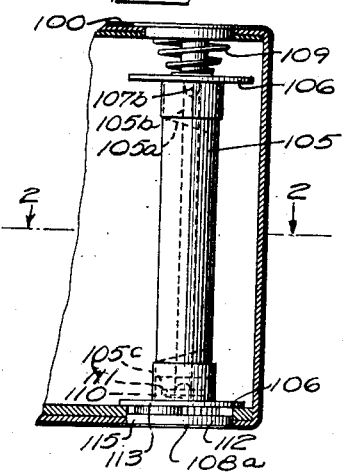
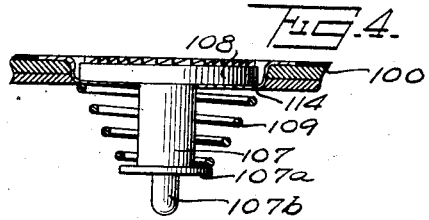
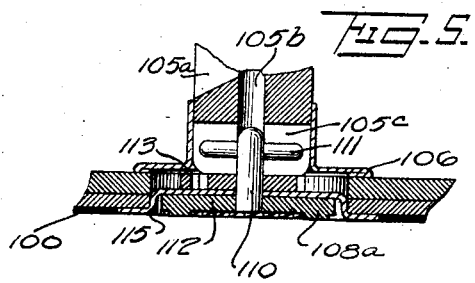
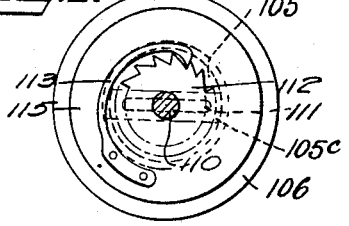
INVENTOR
GEORGE WASHINGTON
BY
ATTORNEY Patented June 7, 1927.

1,631,302

UNITED STATES PATENT OFFICE.

GEORGE WASHINGTON, OF MENDHAM, NEW JERSEY.

FILM-WINDING SPOOL FOR CAMERAS.

Original application filed February 1, 1926, Serial No. 85,130. Divided and this application filed August 12, 1926. Serial No. 128,740.

This invention relates to photographic cameras using flexible films, and consists essentially in a special form of mounting and winding connections for the spool on which such film is wound, whereby the opposite ends of the spool may be firmly grasped between the thumb and finger of one hand of the operator in the winding operation, and also easily removed from the camera casing when the winding of the film spool is completed. This application is a division of my prior application Ser. No. 85,130 filed Feb. 1, 1926.

The best form of apparatus at present known to me embodying my invention is illustrated in the accompanying sheet of drawings in which:

Fig. 1 is a plan view of a form of camera designed to hold photographic films.

Fig. 2 is a detail horizontal section thereof on line 2—2 of Fig. 3, parts being broken away or shown in section, and the back of the casing removed.

Fig. 3 is a detail elevation with parts broken away, others shown in section and with the back of the casing removed to show the spool.

Fig. 4 is a detail vertical section on line 4—4 of Fig. 1.

Fig. 5 is a detail horizontal section on line 5—5 of Fig. 2, but with the lower centering pin shown in full lines, and Fig. 6 is a bottom view of the spool for the film and a cross section of the lower driving connection on a larger scale.

Throughout the drawings like reference characters indicate like parts. 100 represents the main casing. 101 is a removable back for the main casing. When the camera is put into use the film is first unrolled far enough to allow the usual tab on its free end to be inserted in the slot 105$^a$ of the take-up spool 105, so that after successive portions of the film have been exposed for the taking of pictures, said exposed portions may be wound up on said take-up spool 105. The preferred form of take-up spool 105, as shown in the drawings, has the usual end flanges 106, 106, and is detachably supported on the upper centering pin 107 and the lower centering pin 110. Upper pin 107 is rigidly mounted on the under side of button 108, which latter is loosely journaled in the flanged bearing 114 set in the top of the main casing (see Fig. 4). Button 108 and pin 107 are normally forced downward to hold said button in said flanged bearing 114 by the spiral spring 109 which is confined between the flanged bearing 114 and the flange 107$^a$ on the lower portion of the pin 107. Pin 107 has a lower end portion 107$^b$ which is reduced in diameter and engages a centrally bored-out portion 105$^b$ of the spool 105. The lower end of spool 105 is supported by the lower pin 110 which is carried by lower button 108$^a$ journaled in plate 115 fast on, or stamped up from, the bottom part of main casing 100. This pin 110 also enters the lower end of the hole 105$^b$ extending through spool 105 and is detachably locked to said spool by means of the cross pin 111 entering the transverse slot 105$^c$ in the bottom end of said spool. 112 is a small ratchet wheel rigidly mounted on pin 110 and cooperating with spring pawl 113, which latter is rigidly mounted on the fixed plate 115.

It is evident from the above construction that when the operator grasps buttons 108 and 108$^a$ between thumb and forefinger he will compress the spool 105 between them, flange 107$^a$ bearing on the upper end of said spool and the lower end of said spool resting on ratchet wheel 112 which is rigidly connected to lower button 108$^a$, it being understood that the spool 105 is of such length that when the parts are assembled as shown in Fig. 3, the upper button 108 does not quite come to a bearing in its flanged holder 114. If, then, the operator rotates buttons 108 and 108$^a$ in a counter-clockwise direction (looking at Figs. 1, 2 and 5), he will wind a portion of the film onto spool 105, and the pawl and ratchet mechanism 113, 112, will at all times prevent any unwinding action of said spool 105. Buttons 108 and 108$^a$ may have their outer surfaces corrugated as indicated in Figs. 1, 4 and 6 to prevent the operator's thumb and finger slipping on them.

In loading the camera, the casing back 101 is removed, the spool of film placed in position, the film tab wound up on spool 105 and the casing back replaced. The camera is then ready for operation. After each picture is taken the exposed portion of the film is wound up on spool 105, in the manner hereinbefore described, until all of the film has been used. To remove the film, the back 101 of the casing is taken off, the spool 105 pushed upward, compressing spring 109 until the hole 105$^b$ is freed from the lower pin 110, and said spool, with its winding of previously exposed film, is then removed, for development or storage of the film. An empty take-up spool may be then inserted by reversing this procedure, a new spool of film placed in, and threaded across, the camera, the back 101 replaced, and the apparatus will then be ready for continued use.

Various changes evidently could be made in the details of the particular embodiments of the various sub-combinations herein illustrated and described without departing from the principle of the invention so long as the general method of operation and cooperation herein indicated is preserved.

Having described my invention, I claim:

1. In a photographic camera, a take-up mechanism for the previously exposed portions of a sensitized film, which mechanism comprises, in combination, a casing, a spool adapted to fit into said casing and to be connected to that end of said film which has been previously exposed, two revoluble buttons journaled in opposite walls of said casing and having their outer faces exposed, centering means for said spool carried by said buttons, and a driving connection between one of said buttons and said spool whereby the operator may grasp the exposed surfaces of said buttons between the thumb and forefinger of one hand and by rotation of that hand positively rotate said spool.

2. A combination such as defined in claim 1 in which said driving connection is detachable.

3. A combination such as defined in claim 1 in which said driving connection to one of said buttons is detachable, and the centering means for the other end of the spool is spring-pressed against said spool.

4. A combination such as defined in claim 1 in which said driving connection to one of said buttons is detachable, and the other button and centering means carried thereby are movable toward and from said spool.

5. A combination such as defined in claim 1 in which said driving connection to one of said buttons is detachable, and the other button and centering means carried thereby are movable toward and from said spool axially thereof but are elastically held in engagement therewith.

6. In a photographic camera, a take-up mechanism for film to be used in said camera, which mechanism comprises, in combination, a casing, a spool adapted to be connected to that end of a film which has been previously exposed having an axially disposed recess in each end, and two revoluble buttons journalled in opposite walls of said casing, each of said buttons carrying a centrally disposed pin adapted to engage one of said recesses in said spool when it is placed between them, one of said buttons being incapable of axial movement and the other, being capable of slight movement in its journal bearing axially of said spool and having an attached flange adapted to bear on the adjacent end of said spool, whereby, when the operator grasps said buttons and presses them toward one another, said spool is thereby positively compressed between them.

7. A combination such as defined in claim 6 in which one of said pins has a positive but detachable driving connection with said spool.

8. A combination such as defined in claim 6 in which one of said pins has a positive but detachable driving connection with one end of said spool and the other pin is spring-pressed against the other end of said spool.

9. A combination such as defined in claim 6 in which one of said pins has a positive but detachable driving connection with said spool comprising a radial projection on said pin engaging a slot in said spool.

10. In a photographic camera, a take-up mechanism for the previously exposed portions of a sensitized film, which mechanism comprises, in combination, a casing, a spool adapted to fit into said casing and to be connected to that end of said film which has been previously exposed, two revoluble buttons journaled in opposite walls of said casing and having their outer faces exposed, centering means for said spool carried by said buttons, and a driving connection between one of said buttons and said spool, together with a pawl and ratchet mechanism adapted to permit rotation of the last mentioned button in one direction only whereby the operator may grasp the exposed surfaces of said buttons between the thumb and forefinger of one hand and by rotation of that hand in one direction only positively rotate said spool.

GEORGE WASHINGTON.